United States Patent

[11] 3,584,799

| [72] | Inventor | Friedhelm R. Feder<br>North Plainfield, N.J. |
|---|---|---|
| [21] | Appl. No. | 656,384 |
| [22] | Filed | July 27, 1967 |
| [45] | Patented | June 15, 1971 |
| [73] | Assignee | Wedco, Inc.<br>Garwood, N.J. |

[54] DISC MILL FOR WORKING OF THERMOPLASTIC MATERIAL
9 Claims, 4 Drawing Figs.

[52] U.S. Cl. .................................................... 241/44,
241/55, 241/66
[51] Int. Cl. ...................................................... B02c 7/04,
B02c 7/16, B02c 7/17
[50] Field of Search............................................ 241/146,
55—6, 66, 138, 188 (.5), 244—251, 253, 255—9,
44

[56] References Cited
UNITED STATES PATENTS
| 385,035 | 6/1888 | Althouse | 241/146 |
| 387,257 | 8/1888 | Raymond | 241/146 |
| 782,293 | 2/1905 | Warner | 241/296 |
| 1,762,379 | 6/1930 | Bates | 241/146 X |
| 2,412,680 | 12/1946 | Fisher | 241/260 |
| 2,937,815 | 5/1960 | Eirich | 241/245 X |
| 1,368,806 | 2/1921 | Keller | 241/146 |

*Primary Examiner*—Donald G. Kelly
*Attorney*—Frank M. Murphy

ABSTRACT: A disc mill having a pair of milling discs mounted on each end of drive shaft, well suited to milling of thermoplastic materials in an air stream. One of the discs of each pair rotates and structure is provided for circulating air for cooling over the rotating disc. The other disc can be stationary and water cooled. One disc working surface can be flat, the other inclined, with the flat surface terminating outwardly of the inclined surface; this facilitates alignment. The pressure of a small airstream passing through an orifice in the housing can be sensed to determine pressure change in the housing accompanying a change in the flow of the main air stream which would give rise to overheating of the thermoplastic material.

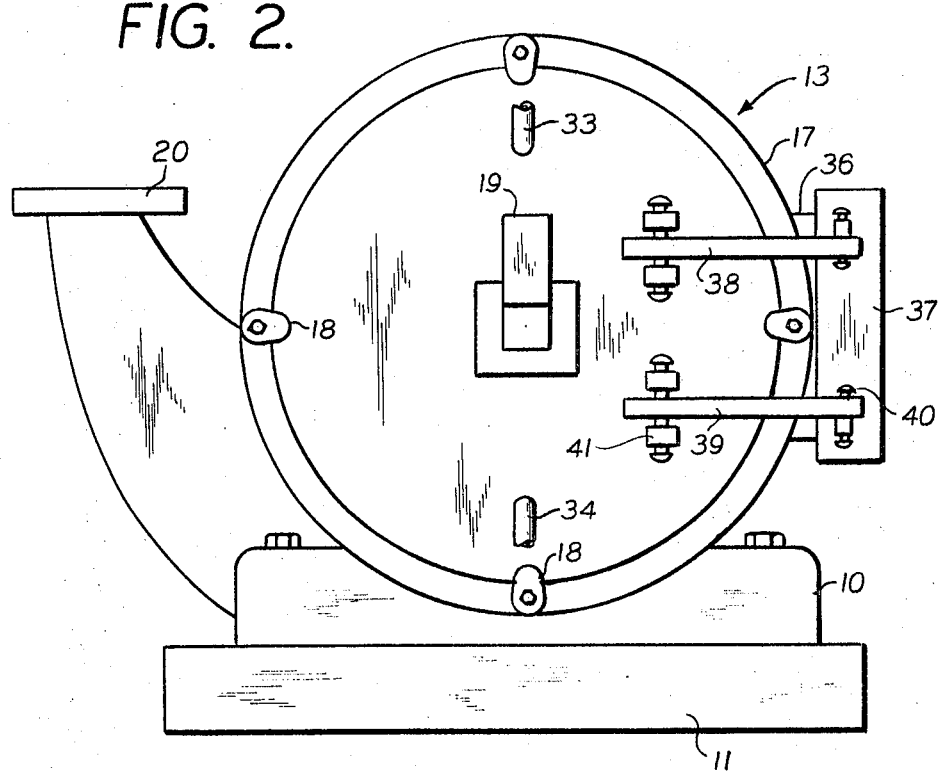
FIG. 2.
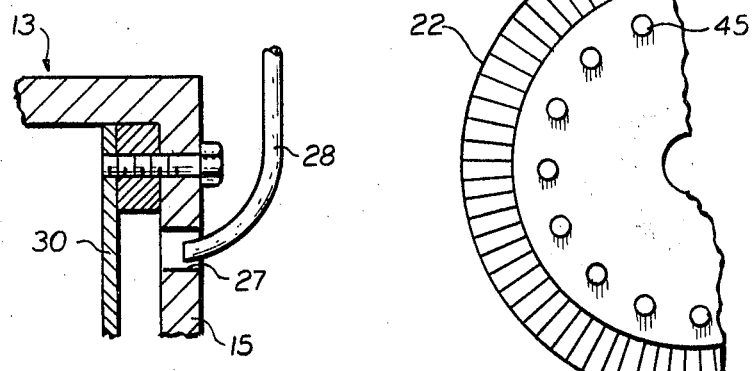
FIG. 3.
FIG. 4.

DISC MILL FOR WORKING OF THERMOPLASTIC MATERIAL

BACKGROUND OF THE INVENTION

The invention relates to disc mills and more particularly to disc mills suitable for the working of plastics.

U.S. Pat. No. 3,302,893, assigned to the assignee hereof, discloses a disc mill well suited for general service in the size reduction of plastics. That mill has counterrotating discs, and means for automatically maintaining a suitable spacing between the discs, and for automatically separating the discs to expel and overload which might cause overheating and melting of the material, requiring a shutdown for cleaning of the machine. That mill is suitable for the working of a large variety of plastic materials, for example polyethylene, and is suitable for producing fine, medium, and course product.

It has been found that whereas counterrotating discs are necessary to produce a good product with many plastics, yet there are others which do not require the counter rotation. Some low-pressure and some high-pressure polyethylenes do not require the counterrotating discs. Just what determines the type working required is not known, and in practice is determined by trial and error.

An important property of the product is its flow characteristics, since the products are used in processes such as rotational molding, and as rug backing. One low-pressure polyethylene might require the use of a counterrorating mill in order to obtain the required low properties, while another low-pressure polyethylene, of the same initial particle size, can be processed in a mill having one rotating disc and one stationary disc, to provide a satisfactory product.

Further, it has been found that in many cases, whether the counterrotating discs are required depends upon the desired particle size of the product. Commonly mills having a single rotating disc are suitable for a medium size product, e.g. a product ranging in size from 30 mesh to 50 mesh, with a very low amount of $-80$ or $-100$ mesh.

Disc mills having a single rotating plate are well known for use in pulping, and the known mills have been used for working plastics. They have a marked disadvantage in that they are not designed for the working of plastics, especially thermoplastics. The heat generated during operation frequently melts the plastic or causes agglomeration of the particles.

Accordingly, it is a principle object of the instant invention to provide a disc mill having rotating and stationary discs, and being suitable for the size reduction of thermoplastic materials, particularly materials intended for rotational molding.

More particularly, the purpose is to provide a mill of relatively inexpensive construction, which includes suitable provision for required cooling of thermoplastic materials so that operation of the mill will be dependable and will not require frequent shut down in order to service the mill after an interruption caused by overheating.

SUMMARY OF THE INVENTION

The disc mill of the invention includes a centrally disposed drive means having a drive shaft extending axially outwardly of each end thereof. A pair of axially spaced cooperating milling discs is mounted on each end of the drive shaft. The inwardly disposed disc of each pair is rotatably mounted on the drive shaft. Preferably, the other disc of each pair is stationary. The disc pairs are contained in housings having an inlet for introduction of material to be worked, and an outlet for discharge of material after working by the discs.

In operation of the mill, the rotating elements effect the milling, and also pump air through the mill from the housing inlet to the housing outlet. Air enters with the material being treated. Cooling is provided for by providing air inlet openings in the housings, in suitable arrangement so that the pumping action will draw air through the air inlet openings, and over surfaces which it is desired to cool and on to the housing outlet. In particular an air inlet opening or openings is provided in each housing disposed between its rotating disc and the drive means for entry of ambient air into the housing and passage radially outwardly over the rotating disc. This cooling air also serves as part of the conveying medium for removing milled material from the periphery of the discs. Stationary disc can be water cooled.

Two advantages are realized by disposing a disc mill on the respective ends of a single shaft. First, with the drive means disposed intermediate the mills, a balancing of thrust forces on the drive means is obtained. Second, improved cooling characteristics for the machine are realized. Half of the total work is done at each of the two spaced mills. This fact reduces heat concentration, and further permits more effective use of the cooling air inlet openings described above.

BRIEF DESCRIPTION OF THE DRAWINGS

The invention is further described with respect to the accompanying drawings, wherein:

FIG. 2 is an end elevation view, as seen from line 2—2 in FIG. 1;

FIG. 3 is an enlarged view of a portion of the mill of FIG. 1, showing of a cooling air inlet opening, and the sensing element of a pressure switch;

FIG. 4 is an end elevation view of a portion of a disc.

DESCRIPTION OF PREFERRED EMBODIMENTS

Figure 1:
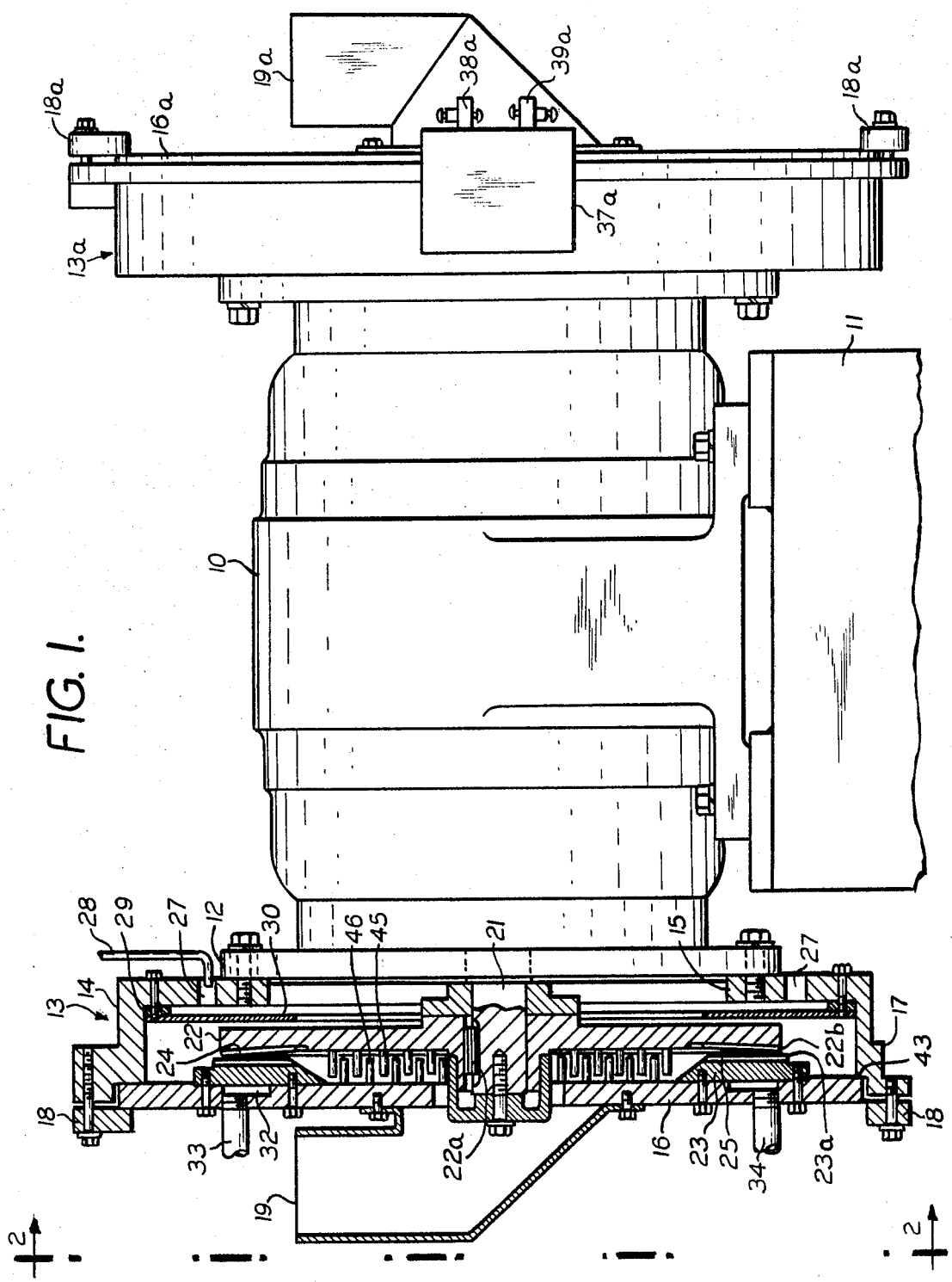
FIG. 1 is a side elevation view, partially in cross section, of a disc mill of the invention.

Referring to the drawings, the disc mill comprises motor drive 10 having drive shaft 21, which projects from both ends of the motor. A pair of discs is disposed at each end of the shaft, and these pairs are contained, respectively, in housings 13 and 13a. The construction for the respective disc pairs, housings, and associated parts, is the same. Referring to the structure shown at the left-hand side of FIG. 1, the housing 13 includes inner end plate 15, and cover plate 16. The cover plate is secured on the housing by lugs 18 which are bolted to a stepped flange 17 formed in the side 14 of the housing. The housing 13 is secured to the flange 12, which can be an integral part of the motor housing 10, or of a part of the motor housing 10.

If desired, the drive means disposed intermediate the disc pairs can be, instead of a motor, a pulley for belt driving. The use of a belt drive offers the advantage of facilitating the speed variation.

Cooperating axially spaced milling discs are disposed in the housing 13. Disc 22 is keyed to shaft 25, by key 22a, for rotation with the shaft 25. A stationary disc 23, in opposed relation to the rotating disc 22, is mounted on the cover plate 16. Rotating disc 22 and stationary disc 23 have contoured working surfaces, respectively, the peripheral portions 24 and 25. These surfaces may be serrated. The radially outwardly directed flow path for material being worked decreases in cross section toward the outer periphery of the rotating disc. The minimum cross section, which is at the outer periphery of the rotating disc, is set by placing shims between the housing flange 17 and the cover plate 16, at 43. The contoured surface of the stationary disc 23 is perpendicular to the shaft 25; the contoured surface of the rotating disc 22 is inclined to the shaft, approaching the stationary disc in the radially outward direction. The outer periphery 23a of the perpendicular stationary disc is disposed outwardly of the outer periphery 22b of the inclined working surface of the rotating disc 22. By reason of this construction, alignment of the working surfaces of the respective discs is facilitated, i.e. the operation will not be affected by minor variation from precise coaxial alignment of the rotating disc 22 and the stationary disc can be inclined, while the working surface of the rotating disc is flat, i.e. perpendicular to the shaft. In any event, the flat working surface terminates outwardly of the inclined working surface. Discs and a mill outfitted with discs contoured and dimensional as is described herein are the subject of application Ser. No. 6680, filed Jan. 28, 1970.

In the embodiment illustrated, the respective disc 22 and 23 are provided with axially projecting pins 45 and 46. As is shown in FIG. 4, the pins 45 are disposed at spaced locations about a circle concentric with the periphery of the disc. The pins 46 mounted on the stationary disc 23 are similarly arranged, preferably outwardly, of the pins 45 on the rotating disc. The provision of pins provides for size reduction as is practiced in so-called pin mills. The mill of the invention need not include the pins. They may be advantageous when a friable material, such as cellulose or urea formaldehyde or melamine is treated. In this way, a breaking action as is obtained in pin mills, is obtained in combination with the milling as is effected by the contoured surfaces 24 and 25 of the discs. The pins may have smooth or rough surfaces. They can be threaded.

The housing 13 is provided with inlet 19 for introduction of material to be worked by the mill, and outlet 20 (FIG. 2) for discharge of material after working by the discs. The rotation of the disc 22 causes a pumping action whereby air is drawn into the mill with the material being treated, and the air and material are pumped toward the periphery of the housing. The material issues from between the discs, and is then carried by the air through the outlet 20. If desired vacuum can be applied.

To provide improved cooling, cooling air inlet openings 27 are formed. The inner end 15 of the housing, which is disposed between the rotatable disc 22 and the motor 10. By reason of the pumping action of the mill, ambient air will be drawn into the housing. This air is to flow radially outwardly over the rotating disc for cooling thereof, and then to the periphery of the disc where it combines with air initially brought in with the material, and serves as auxiliary conveying air for the material. The air inlet openings 27 are disposed radially outwardly of the drive shaft 25. To provide the desired flow radially outwardly over the rotating disc 22, a radially inwardly extending baffle 30 is provided. The baffle 30 terminates short of the drive shaft 25, for directing the air from the air inlet opening radially inwardly and then radially outwardly over the rotating disc 22. A spacer 29 is disposed between the outer end of the baffle 30 and the inner end wall 15 of the housing, to provide suitable positioning of the baffle.

The stationary disc 23 can be water cooled. For this purpose, an annular groove 32 is provided in the inwardly disposed side of the cover plate 16, for water circulation. Water inlet 33, and water outlet 34 are connected with the water passageway 32.

In the operation of the mill, the air which passes through the mill prevents the material milled from overheating. Any interruption in the flow of the airstream will cause rapid heating of the material, whereupon melting or agglomeration may occur. The invention provides means for sensing interruption in the airstream, and in response thereto, modifying the operation, e.g. interrupting the feeding of material to the machine or shutting off the drive means, before injury to the material occurs. To this end, a relatively small airstream can be passed through an orifice communicating the inside of the housing with the ambient atmosphere. The pressure of this airstream can be sensed, and upon occurrence of a change in that pressure, corresponding to a change in the passage of air through the housing threatening injury to the material, the working of the material is interrupted.

Referring to FIG. 3, an open ended conduit is placed in cooling air inlet 27. Pressure change in the housing due to a change in the flow of the airstream therethrough, causes a change in the pressure in the air inlet opening 27. This will in turn cause a change in pressure in the conduit 28. If the airstream through the mill is interrupted or the flow rate thereof is reduced, the pressure in the air inlet 27 will rise, and a corresponding rise will occur in the conduit 28. Known means can be used for response to changes in pressure in the conduit 28, and operation, upon response, to effect interrupting of feed of material to the mill, or the stopping of the drive means, The cover plate 16 is mounted on the housing 13 by a hinge connection as is best seen in FIG. 2, and at the right-hand side of FIG. 1. Plate 37 is secured to housing 13 by element 36. The arms 38 and 39 are pivotally connected at one end to the plate 37, and at the other end to the cover plate 16. Thus, the arm 39 is pivotally connected to the plate 37 at 40, and is similarly connected to the cover plate 16 at 41. By so mounting the cover plate 16, sufficient play is provided so that a flush fit of the cover plate 16 in the stepped flange 17, with any desired number of shims disposed at 43 (FIG. 1) between the cover plate and the stepped flange.

As mentioned previously, the construction at the right-hand end of the device shown in FIG. 1 is the same as is shown for the left-hand end. Referring to the right-hand end, the housing 13a is provided with cover plate 16a, which is secured in place by lugs 18a, and is hinged on the housing by a connection including the arms 38a and 39a, and the plate 37. Inlet 19a is mounted on the cover plate 16a.

EXAMPLE

A mill as is shown in FIG. 1 may have a 100 horsepower, 3,600 r.p.m. motor. The rotating discs can be 28 inches in diameter, while the stationary discs are 28¼ inches in diameter. The working surfaces can be radially extending V-shaped grooves providing serrated surfaces, and the pins can be omitted so that substantially all of the working of the material is done by the serrated surfaces. The spacing of the working surfaces can be about 0.025 inches. The number of cooling air inlet openings 27 can be 12, at equally spaced intervals about the inner end of the housing. The diameter of these openings can be 2 inches. Such a mill is suitable for size reducing many low-pressure polyethylenes from an initial pellet size of about one eighth to one fourth inch to a fine material of mesh 20 to mesh 70.

While the invention has been described with respect to particular embodiments thereof, these embodiments are merely representative, and do not serve to define the limits of the invention.

I claim:
1. A disc mill comprising:
   a. a centrally disposed drive means having a single drive shaft which extends axially outwardly of each end of the drive means providing two drive shaft ends,
   b. a pair of axially spaced cooperating milling discs disposed at each drive shaft end, the inwardly disposed disc of each pair being substantially fixedly mounted on the drive shaft for rotation to effect milling and pumping of air through the mill,
   c. a housing for each disc pair having an inlet for introduction of material for working by the discs, and an outlet for discharge of material after working by the discs,
   d. an air inlet opening in each housing disposed between said rotatable disc and the drive means for entry of ambient air into the housing in response to the pumping action and passage radially outwardly over the rotating disc for cooling thereof and to the periphery of the discs for service in conveying milled material from the discs to the outlet.

2. Disc mill according to claim 1, said air inlet openings being disposed radially outwardly of the drive shaft, each housing including a radially inwardly extending baffle terminating short of the drive shaft, for directing air entering through the air inlet opening radially inwardly and then radially outwardly over the rotating disc.

3. Disc mill according to claim 2, the outer disc of each pair being stationary.

4. Disc mill according to claim 3, and means for water cooling the outer discs.

5. A disc mill comprising:
   a. a centrally disposed drive means having a single drive shaft which extends axially outwardly of each end of the driving means providing two drive shaft ends, b. a pair of axially spaced cooperating milling discs disposed at each drive shaft end, the inwardly disposed disc of each pair being substantially fixedly mounted on the drive shaft for rotation to effect milling and pumping of air through the mill, c. a housing for each disc pair having an inlet for introduction of material for working by the discs, and an outlet for discharge of material after working by the discs.

6. Disc mill according to claim 1, the outwardly disposed disc of each pair being stationary.

7. Disc mill according to claim 6, and means for water cooling the outer discs.

8. Disc mill according to claim 5, the outer disc of each pair being stationary.

9. Disc mill according to claim 8, and means for water cooling the outer discs.

UNITED STATES PATENT OFFICE
CERTIFICATE OF CORRECTION

Patent No. 3,584,799      Dated June 15, 1971

Inventor(s) Friedhelm R. Feder

It is certified that error appears in the above-identified patent and that said Letters Patent are hereby corrected as shown below:

Column 2, line 69, after "stationary disc" insert -- 23. If desired the working surface of the stationary disc --.

Signed and sealed this 14th day of March 1972.

(SEAL)
Attest:

EDWARD M. FLETCHER, JR.
Attesting Officer

ROBERT GOTTSCHALK
Commissioner of Patents